(12) United States Patent
Ravishankar et al.

(10) Patent No.: US 8,620,263 B2
(45) Date of Patent: Dec. 31, 2013

(54) METHODS, SYSTEMS, AND COMPUTER READABLE MEDIA FOR DIAMETER ROUTING AGENT (DRA) BASED CREDIT STATUS TRIGGERED POLICY CONTROL

(75) Inventors: Venkataramaiah Ravishankar, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/277,626

(22) Filed: Oct. 20, 2011

(65) Prior Publication Data
US 2012/0099715 A1      Apr. 26, 2012

Related U.S. Application Data

(60) Provisional application No. 61/405,154, filed on Oct. 20, 2010, provisional application No. 61/408,957, filed on Nov. 1, 2010.

(51) Int. Cl.
*H04M 15/00* (2006.01)
*H04W 4/26* (2009.01)
*H04W 8/02* (2009.01)

(52) U.S. Cl.
USPC .............. 455/406; 379/114.01; 379/114.17; 379/114.2

(58) Field of Classification Search
USPC ............... 379/111, 114.01, 114.17, 114.18, 379/114.2, 114.28, 114.29, 115.01, 121.01, 379/127.03, 127.05, 144.01, 144.06; 455/406, 408, 409
See application file for complete search history.

(56) References Cited

U.S. PATENT DOCUMENTS

| | | | |
|---|---|---|---|
| 3,917,915 | A | 11/1975 | Karras |
| 4,162,377 | A | 7/1979 | Mearns |
| 4,191,860 | A | 3/1980 | Weber |
| 4,310,727 | A | 1/1982 | Lawser |
| 4,313,035 | A | 1/1982 | Jordan et al. |
| 4,385,206 | A | 5/1983 | Bradshaw et al. |
| 4,754,479 | A | 6/1988 | Bicknell et al. |
| 4,756,020 | A | 7/1988 | Fodale |

(Continued)

FOREIGN PATENT DOCUMENTS

| | | |
|---|---|---|
| EP | 0 088 639 | 9/1983 |
| EP | 0 212 654 | 5/1987 |

(Continued)

OTHER PUBLICATIONS

Second Office Action for Chinese Patent Application No. 200780051876.7 (Dec. 5, 2012).

(Continued)

*Primary Examiner* — Binh Tieu
(74) *Attorney, Agent, or Firm* — Jenkins, Wilson, Taylor & Hunt, P.A.

(57) ABSTRACT

According to one aspect, the subject matter described herein includes a method for credit status triggered policy control. The method may include monitoring one or more credit control request (CCR) and credit control answer (CCA) messages associated with a request of credit for a subscriber. The method may further include determining whether an amount of granted credit for a service flow associated with the subscriber has reached a predetermined minimum threshold value. The method may further include notifying a policy and charging rules function (PCRF) of the credit status associated with the subscriber when the predetermined minimum threshold value has been reached.

21 Claims, 7 Drawing Sheets

(56) References Cited

U.S. PATENT DOCUMENTS

| | | |
|---|---|---|
| 4,769,834 A | 9/1988 | Billinger et al. |
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,608 A | 8/1994 | Mains, Jr. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,802,145 A | 9/1998 | Farris et al. |
| 5,812,639 A | 9/1998 | Bartholomew et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,009,160 A | 12/1999 | Sonnenberg |
| 6,021,126 A | 2/2000 | White et al. |
| 6,028,914 A | 2/2000 | Lin et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,128,304 A | 10/2000 | Gardell et al. |
| 6,128,377 A | 10/2000 | Sonnenberg |
| 6,134,307 A | 10/2000 | Broukman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,138,023 A | 10/2000 | Agarwal et al. |
| 6,181,937 B1 | 1/2001 | Joensuu |
| 6,182,086 B1 | 1/2001 | Lomet et al. |
| 6,188,752 B1 | 2/2001 | Lesley |
| 6,208,872 B1 | 3/2001 | Schmidt |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,584,183 B2 | 6/2003 | Manto |
| 6,611,516 B1 | 8/2003 | Pirkola et al. |
| 6,633,764 B1 | 10/2003 | Garcia |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,801,781 B1 | 10/2004 | Provost et al. |
| 6,856,676 B1 | 2/2005 | Pirot et al. |
| 6,963,583 B1 | 11/2005 | Foti |
| 6,968,052 B2 | 11/2005 | Wullert, II |
| 7,058,036 B1 | 6/2006 | Yu et al. |
| 7,333,809 B2 | 2/2008 | Engelhart |
| 2001/0031641 A1 | 10/2001 | Ung et al. |
| 2001/0034224 A1 | 10/2001 | McDowell et al. |
| 2002/0029189 A1 | 3/2002 | Titus et al. |
| 2002/0058507 A1 | 5/2002 | Valentine et al. |
| 2002/0111153 A1 | 8/2002 | Hartmaier et al. |
| 2002/0150079 A1 | 10/2002 | Zabawskyj et al. |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |
| 2003/0177281 A1 | 9/2003 | McQuillan et al. |
| 2003/0203740 A1 | 10/2003 | Bahl et al. |
| 2004/0003037 A1 | 1/2004 | Fujimoto et al. |
| 2004/0153506 A1 | 8/2004 | Ito et al. |
| 2004/0166878 A1 | 8/2004 | Erskine et al. |
| 2004/0176086 A1 | 9/2004 | Chatterjee et al. |
| 2004/0213393 A1 | 10/2004 | Bedingfiled et al. |
| 2004/0233840 A1 | 11/2004 | Bye |
| 2004/0240638 A1 | 12/2004 | Donovan |
| 2005/0027867 A1 | 2/2005 | Mueller et al. |
| 2005/0070310 A1 | 3/2005 | Caspi et al. |
| 2005/0202836 A1 | 9/2005 | Schaedler et al. |
| 2006/0025114 A1 | 2/2006 | Bales et al. |
| 2006/0291486 A1 | 12/2006 | Cai et al. |
| 2006/0291488 A1 | 12/2006 | Naqvi et al. |
| 2007/0185809 A1* | 8/2007 | Duan ............... 705/39 |
| 2008/0160954 A1 | 7/2008 | Agarwal et al. |
| 2009/0285225 A1 | 11/2009 | Dahod |
| 2009/0327112 A1* | 12/2009 | Li et al. ............... 705/34 |
| 2010/0137002 A1 | 6/2010 | Agarwal et al. |
| 2010/0161802 A1 | 6/2010 | Tofighbakhsh et al. |
| 2010/0184403 A1* | 7/2010 | Cai et al. ............... 455/406 |
| 2010/0287121 A1 | 11/2010 | Li et al. |
| 2011/0003579 A1* | 1/2011 | Cai et al. ............... 455/408 |
| 2011/0170412 A1 | 7/2011 | Ramadas et al. |
| 2011/0208853 A1 | 8/2011 | Castro-Castro et al. |
| 2011/0225309 A1 | 9/2011 | Riley et al. |

(56) References Cited

U.S. PATENT DOCUMENTS

| | | | |
|---|---|---|---|
| 2011/0231540 | A1 | 9/2011 | Tai et al. |
| 2011/0246586 | A1 | 10/2011 | Steele |
| 2011/0307790 | A1 | 12/2011 | Pandya et al. |
| 2012/0026947 | A1 | 2/2012 | Miller et al. |
| 2012/0034900 | A1* | 2/2012 | Agarwal ............... 455/406 |
| 2012/0084371 | A1 | 4/2012 | Rajagopalan et al. |
| 2012/0096139 | A1 | 4/2012 | Cackowski et al. |
| 2012/0129488 | A1* | 5/2012 | Patterson et al. ......... 455/406 |
| 2012/0163297 | A1* | 6/2012 | Agarwal et al. .......... 370/328 |
| 2012/0220330 | A1 | 8/2012 | Goldner et al. |
| 2012/0257499 | A1 | 10/2012 | Chatterjee et al. |
| 2013/0017803 | A1* | 1/2013 | Li et al. ............... 455/406 |
| 2013/0036215 | A1 | 2/2013 | Kupinsky et al. |

FOREIGN PATENT DOCUMENTS

| | | |
|---|---|---|
| EP | 0 258 654 | 3/1988 |
| EP | 0 264 023 | 4/1988 |
| EP | 1 100 279 A2 | 5/2001 |
| GB | 2 382 267 | 5/2003 |
| JP | 58-215164 | 12/1983 |
| JP | 62-200859 | 9/1987 |
| KR | 1020030025024 A | 3/2003 |
| WO | WO 84/01073 | 3/1984 |
| WO | WO 86/03915 | 7/1986 |
| WO | WO 88/00419 | 1/1988 |
| WO | WO 97/33441 | 9/1997 |
| WO | WO 99/14910 | 3/1999 |
| WO | WO 00/16583 | 3/2000 |
| WO | WO 00/35155 A1 | 6/2000 |
| WO | WO 01/20920 A1 | 3/2001 |
| WO | WO 01/56308 A2 | 8/2001 |
| WO | WO 2006/031678 A2 | 3/2006 |
| WO | WO 2008/085432 A1 | 7/2008 |
| WO | WO 2012/021344 A2 | 2/2012 |

OTHER PUBLICATIONS

First Office Action for Chinese Patent Application No. 200780051876.7 (Mar. 7, 2012).

Final Official Action for U.S. Appl. No. 11/890,299 (Dec. 9, 2010).

"3rd Generation Partnership Project; Technical Specification Group Services and System Aspects; Telecommunication management; Charging management; Diameter charging applications (Release 9)," 3GPP TS 32.299 V9.4.0, pp. 1-148 (Jun. 2010).

Non-Final Official Action for U.S. Appl. No. 11/890,299 (Apr. 15, 2010).

"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).

3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).

Communication of European Publication Number and Information on the Application of Article 67(3) EPC for European Patent No. 2116021 (Oct. 14, 2009).

Declaration of Gregory A. Hunt (Dec. 15, 2008).

Notification of Transmittal of the International Search Report and the Written Opinion of the International Searching Authority, or the Declaration for International Application No. PCT/US07/26232 (May 15, 2008).

"BICC Architecture and BICC Protocol Details," Tekelec, p. 28-41 (2008).

"BICC Signaling Router (BSR) Reference Architecture (WP005274)," Tekelec, p. 2-91 (2008).

Jennings et al., "Session Initiation Protocol (SIP) URIs for Application such as Voicemail and Interactive Voice Response (IVR)," The Internet Society, RFC 4458 (Apr. 2006).

Hakala et al., "Diameter Credit-Control Application," Network Working Group RFC 4006, pp. 1-114 (Aug. 2005).

"Interworking Between Session Initiation Protocol (SIP) and Bearer Independent Call Control Protocol or ISDN User Part," ITU-T Q.1912.5, p. 1-101 (Mar. 2004).

"Prepaid vs. Number Portability," Power Point presentation (publication date unknown; electronic file creation date Jul. 29, 2003.).

"Bearer Independent Call Bearer Control Protocol," ITU-TQ.1950, p. 1-96 (Dec. 2002).

Chang, "BICC Extension of SIP in Inter-Network Configuration," Internet Engineering Task Force, draft-chang-sipping-bicc-network-00.txt, pp. 1-17 (Mar. 2002).

Marshall et al., "SIP Extensions for Supporting Distributed Call State," SIP Working Group, Internet Draft, pp. 1-12 (Aug. 2001).

"Bearer Independent Call Control Protocol (Capability Set 2) and Signalling System No. 7 ISDN User Part: Formats and Codes," ITU-T Q.1902.3, p. 1-141 (Jul. 2001).

"Bearer Independent Call Control Protocol (Capability Set 2) and Signaling System No. 7 ISDN user part: General Functions of Messages and Parameters," ITU-T Q.1902.2 (Jul. 2001).

"Bearer Independent Call Control Protocol (Capability Set 2): Functional Description," ITU T Q.1902.1, p. 1-23 (Jul. 2001).

"Bearer Independent Call Control Protocol," ITU-T Q.1901 (Jun. 2000).

Sugano et al., "Presence Information Data Format for IMPP," Internet draft, draft ietf-impp-pidf-01.text, Network Working Group, pp. 1-17 (Mar. 10, 2000).

Liao et al., "SS7-TCAP/IP Interworking," Internet Engineering Task Force, pp. 1-14 (Mar. 1999).

Notice of Allowance and Fee(s) Due for U.S. Appl. No. 11/890,299 (Mar. 26, 2013).

Non-Final Office Action for U.S. Appl. No. 13/048,629 (Feb. 15, 2013).

3GPP, "Policy and Charging Control Over Rx Reference Point," 3GPP ETSI TS 29.214 version 8.3.0 Release 8 (Feb. 2009).

Non-Final Office Action for U.S. Appl. No. 13/402,756 (May 10, 2013).

Non-Final Office Action for U.S. Appl. No. 13/274,936 (May 1, 2013).

Notification of Transmittal of the International Search Report and the Written Opinion of the International Searching Authority, or the Declaration for International Application No. PCT/US2012/026178 (Jul. 30, 2012).

Commonly-assigned, co-pending International Application No. PCT/US12/26178 for "Methods, Systems, and Computer Readable Media for Network Metadata Based Policy Control," (Unpublished, filed Feb. 22, 2012).

"About 3GPP: What is the difference between a SIM and a USIM? What is a UICC?," About http://www.3gpp.org/FAQ#outil_sommaire_58, pp. 1-11 (Copyright 2012).

"Smart Cards; Card Application Toolkit (CAT) (Release 10)," ETSI TS 102 223 V10.5.0, pp. 1-224 (Sep. 2011).

"3rd Generation Partnership Project; Technical Specification Group Services and System Aspects; Universal Geographical Area Description (GAD) (Release 10)," 3GPP TS 23.032, pp. 1-29 (Mar. 2011).

"3rd Generation Partnership Project; Technical Specification Group Core Network and Terminals; Policy and Charging Control over Rx reference point (Release 9)," 3GPP TS 29.214 V9.3.0, pp. 1-44 (Mar. 2010).

3GPP, "Digital Cellular Telecommunications System (Phase 2+); Universal Mobile Telecommunications System (UMTS); Universal Subscriber Indentity Module (USIM) Application Toolkit (USAT) (3GPP TS 31.111 version 8.3.0 Release 8)," ETSI TS 131 111 V8.3.0, pp. 1-102 (Oct. 2008).

* cited by examiner

METHODS, SYSTEMS, AND COMPUTER READABLE MEDIA FOR DIAMETER ROUTING AGENT (DRA) BASED CREDIT STATUS TRIGGERED POLICY CONTROL

PRIORITY CLAIM

This application claims the benefit of U.S. Provisional Patent Application Ser. No. 61/405,154 filed Oct. 20, 2010 and U.S. Provisional Patent Application Ser. No. 61/408,957 filed Nov. 1, 2010; the entire contents of which are hereby incorporated by reference herein.

TECHNICAL FIELD

The subject matter described herein relates to modification of one or more subscriber policies based on observed credit allocation and/or credit status information. More specifically, the subject matter relates to methods, systems, and computer readable media for Diameter routing agent (DRA) based credit status triggered policy control.

BACKGROUND

Current architecture within telecommunications networks includes both a charging system and a policy server. Typically, the charging system is responsible for rating and charging and the policy server is responsible for determining the right policy depending, for example, upon the type of network traffic. In one aspect, a policy and charging rules function (PCRF), or policy engine, at its most basic level, is a server that deploys a set of operator-created business rules in a communications network. Such rules can include policy and charging control (PCC) rules derived in the PCRF using information provided by a subscription profile repository (SPR) and/or application function (AF). Currently, PCC rules can be utilized, inter alia, for implementing service data flow (SDF) gating and QoS controls associated with subscribers in the network.

The charging system of a telecommunications network may include an online charging system (OCS) allowing a service provider to charge subscribers in real time, or near real time, based upon service usage. For example, mobile network operators may offer prepaid calling plans to mobile subscribers where the subscribers pay for voice or data calls in advance of placing the calls. An amount of prepaid service units or credit is set aside and dedicated to paying for the calls. The OCS may determine whether a subscriber is authorized to perform a given action based upon the prepaid credit status associated with the subscriber. A policy and charging enforcement function (PCEF) is then responsible for applying the proper policy and charging scheme to network traffic according to input received from each of the PCRF and OCS. As another example, OCS can be used to generate credit threshold alerts to postpaid subscribers. In this example, OCS may be used to alert a user if he or she exceeds a specific monetary threshold value.

One problem associated with current methods and systems for charging prepaid or generating alerts to postpaid subscribers includes network latency due to the extraneous or wasted signaling and/or processing capacity necessary to receive policy and charging input from each of the PCRF and OCS. Another problem is the additional interface functionality that may be required between multiple PCEF, PCRF and OCS nodes that are not available in the deployed system. For example, in current systems and methods the PCRF must obtain the subscriber credit interface through the PCEF and then must instruct the PCEF to continuously interrogate the OCS using subscriber parameters to determine the subscriber credit and pass that information to PCRF. Alternatively, new interface functions must be developed on OCS and PCRF nodes where PCRF will receive the subscriber credit information either through continuous polling or pushing from OCS to PCRF. Accordingly, in light of these difficulties, a need exists for improved methods, systems, and computer readable media for logically accessing credit at the PCRF using information provided by the OCS by providing Diameter routing agent (DRA) based credit status triggered policy control.

SUMMARY

According to one aspect, the subject matter described herein includes a method for Diameter routing agent (DRA) based credit status triggered policy control. The method may include monitoring one or more credit control request (CCR) and credit control answer (CCA) messages associated with a request of credit for a subscriber. The method may further include determining whether an amount of granted credit for a service flow associated with the subscriber has reached a predetermined minimum threshold value. The method may further include notifying a policy and charging rules function (PCRF) of the credit status associated with the subscriber when the predetermined minimum threshold value has been reached.

A system for DRA based credit status triggered policy control is also disclosed. The system may enable a policy function or server, for example, the PCRF to modify or adjust policy for a subscriber based on observed credit allocation and/or credit status information. In one embodiment the system may include a credit monitoring and rules (CMR) function for monitoring one or more credit control request (CCR) and credit control answer (CCA) messages associated with a request of credit for a subscriber. The CMR function may also determine whether an amount of granted credit for a service flow associated with the subscriber has reached a predetermined minimum threshold value based upon one or more credit reporting rules. The system may further include an interface for notifying the PCRF of the credit status associated with the subscriber when the predetermined minimum threshold value has been reached.

The subject matter described herein for DRA based credit status triggered policy control may be implemented using a non-transitory computer readable medium to having stored thereon executable instructions that when executed by the processor of a computer control the processor to perform steps. Exemplary non-transitory computer readable media suitable for implementing the subject matter described herein may include chip memory devices and/or disk memory devices accessible by a processor, programmable logic devices, and application specific integrated circuits.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for Diameter routing agent (DRA) based credit status triggered policy control. Notably, the present subject matter described herein provides novel systems and methods for enabling credit status triggered policy control in a communications network, such as a Long Term Evolution (LTE)-based network, Evolved Packet Core (EPS)-based network, or General Packet Radio Service (GPRS)-based network.

As mentioned above, a policy and charging enforcement function (PCEF) applies an appropriate policy and charging scheme to network traffic according to input received from each of a policy server and a charging system. Such requirement may allow for extraneous signaling and/or wasted processing capacity within a network and may also discourage flexible, intelligent policy decisions logically based upon subscriber credit status. Notably, methods, systems, and computer readable media described herein allow for intelligent modification and/or adaptation of policy and charging control (PCC) rules at the policy charging and rules function (PCRF) that can become triggered upon observed credit allocation and/or credit status information routed from the online charging system (OCS) via the DRA. For example, the DRA may include a credit monitoring and reporting (CMR) function for monitoring credit information and determining the presence of minimum credit threshold values according to one or more credit rules. When minimum credit thresholds become reached, CMR can automatically notify PCRF to generate one or more new and/or modified PCC rules. Notably, credit threshold events may also be communicated to the subscriber via the subscriber device. By applying the subject matter described herein, the PCRF may become triggered to automatically and logically modify or adjust policy for a subscriber based on observed credit allocation and/or credit status information. That is, CMR may notify PCRF via a credit status report indicating that a credit threshold crossing event has occurred, thereby allowing for intelligent, scalable policy control within the network.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
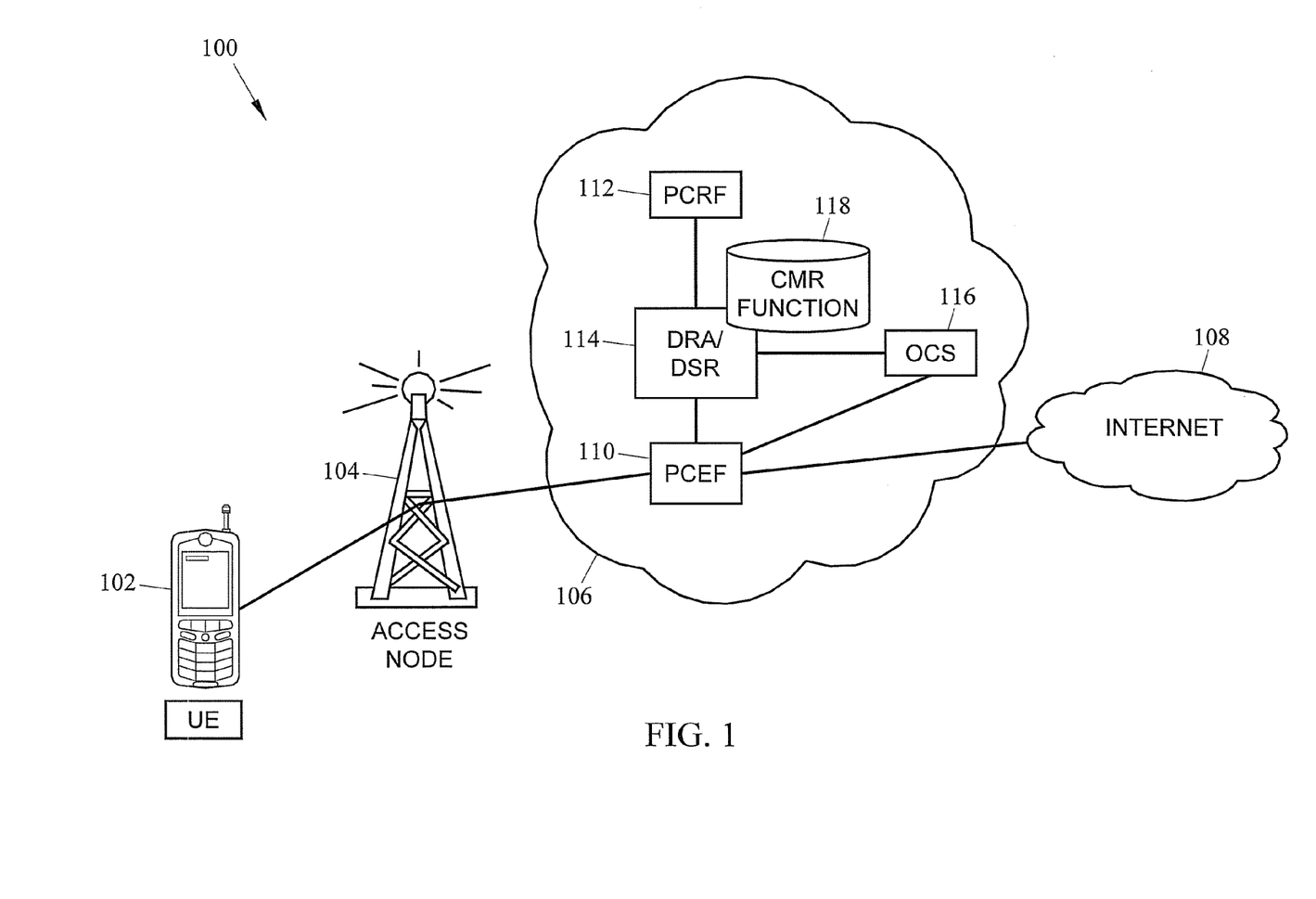
FIG. 1 is a network diagram showing an exemplary network for Diameter routing agent (DRA) based credit status triggered policy control according to an embodiment of the subject matter described herein.

FIG. 1 is a network diagram showing an exemplary network for credit status triggered policy control according to an embodiment of the subject matter described herein. FIG. 1 illustrates an exemplary communications network 100 according to an embodiment of the subject matter described herein. Referring to FIG. 1, network 100 may include user equipment (UE) 102, an access node (AN) 104 (e.g., a base transceiver station (BTS) or evolved node b), a core network 106, and the Internet 108.

UE 102 represents a device, such as a mobile handset, for communicating with one or more portions of network 100. For example, UE 102 may include a computer, a pager, a smartphone, a phone, a wireless modem, a computing platform, a mobile handset, other subscriber devices and/or combinations thereof. UE 102 may communicate with access node 104. UE 102 may be adapted to receive event notifications via a message service (SMS) message, a multimedia message service (MMS) message, an instant message (IM), an email message, a voicemail, an XML message, a simple object access protocol message, a Diameter protocol message, a session initiation protocol (SIP) message, combinations thereof, and/or messages including any other suitable message protocol/format.

Access node 104 may be located within an access network (not shown). The access network may include nodes, functions, devices, and/or other components configured to provide UE 102 access to services, functions, applications, or devices in one or more networks (e.g., core network 106). For example, an access network may include a radio access network (RAN) or other access network, such as a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, or an evolved HSPA (eHSPA+) network. In one embodiment, access node 104 may perform radio access functions for connecting UE 102 with various communications networks and/or nodes. In one embodiment, access node 104 may communicate with core network 106 using gateway functionality. For example, access node 104 or other node (e.g., a gateway) may communicate messages (e.g., authentication or mobility related messages) to one or more nodes within the core network 106.

Core network 106 may include an operator network for providing services to UE 102. For example, core network 106 may perform network aggregation, charging, and authentication functions for UE 102. In one embodiment, core network 106 may include a 3G network, a 3G+ network, a GSM network, a 4G network, an LTE network, an evolved packet core (EPC) based network, a 3rd Generation Partnership Project (3GPP) network, a GPRS core network, IMS, or other network. Methods and systems described herein may facilitate credit status triggered policy control for a prepaid subscriber to be implemented across core network 106, for example, by automatically generating new or modified PCC rules based upon an observed credit status associated with the subscriber. Methods and systems described herein may also facilitate credit status triggered policy control for postpaid subscribers by automatically generating new or modified PCC rules based upon alerts that subscribers have exceeded a specific monetary value or threshold associated.

Core network 106 may include one or more policy functions including a PCEF 110 and a PCRF 112. PCEF 110 may include a node for communicating between core network 106 and external networks, e.g., the Internet 108 or other private networks (not shown). PCRF 112 may include a node for generating policy rules (e.g., PCC rules) associated with subscribers and/or traffic across the network. PCEF 110 may request and/or enforce policy rules derived in PCRF 112. In one embodiment, PCEF 110 may include any suitable entity for enforcing policies (e.g., via one or more policy rules or policy elements such as PCC rules). For example, PCEF 110 may include functionality located at a gateway (e.g., a packet data network (PDN) gateway) or other node for communicating between networks, e.g., Internet 108 or other networks.

In one embodiment, PCEF 110 manages and enforces PCC rules provisioned from PCRF 112. For example, PCC rules may be provided to each service data flow (SDF) and/or subscriber device, e.g., UE 102 attempting to use or access PCEF 110, and may include information for handling various traffic and situations. Collectively, PCEF 110 and PCRF 112 push or pull PCC rules to access edge devices where charging, SDF gating, and QoS can be provided. Where core network 106 includes an IMS Fixed network, PCRF 112 may include a resource admission control subsystem (RACS) (see FIGS. 2A, 2B, 4A, and 4B indicating PCRF/RACS 112). In one embodiment, PCEF 110 may include or be integrated with a gateway GPRS support node (GGSN) for communicating between a GPRS network and external networks, e.g., the Internet 108 or private networks (not shown). Where core network 106 includes a GPRS core network, PCEF 110 may include a GGSN. In this embodiment, PCEF 110 may communicate with serving GPRS support node (SGSN) or other gateway for providing services to UE 102.

PCRF 112 may include any suitable policy entity or policy control function for deriving, generating, obtaining, creating, selecting, or otherwise determining policies (e.g., one or more PCC rules). For example, PCRF 112 may include a stand-alone node, e.g., a policy server or a multimedia policy engine (MPE), or may be co-located and/or integrated with one or more nodes in network 100. PCRF 112 may retrieve policy information via communications with a subscription profile repository (SPR) via an Sp interface. An application function (AF, not shown) can also instruct PCEF 110 over the Rx interface or a simple object access protocol (SOAP) interface regarding the session details for which policy has to be applied. Notably, according to embodiments herein PCRF 112 may also communicate with another node, such as a Diameter routing agent and/or a Diameter signaling router DRA/DSR 114 where policy decisions may be triggered based upon the credit status of the subscriber. PCRF 112 may derive and communicate PCC rules to PCEF 110 using a re-authorization request (RAR) message communicated via a Gx interface. Such rules may affect the treatment of each SDF under PCC control in accordance with policy decisions.

In one embodiment, PCC rules can include filters used for charging or policing SDFs. That is, PCC rules can include definitions for charging a subscriber based on various characteristics of usage (e.g., data size, data type, or individual media streams within a session). In this example, PCEF 110 may control access to external networks and charge for such access based on rules received from PCRF 112. Notably, PCRF 112 may derive policy elements or rules, for example, PCC rules using credit information provided by DRA/DSR 114. PCC rules may be communicated to PCEF 110 in various ways. For example, where PCEF 110 is located in or associated with the packet gateway and interfaces with a serving gateway (S-GW) via GPRS tunneling protocol, PCRF 112 may push rules to PCEF 110 in the packet gateway (P-GW). Alternatively, rules may be pushed from PCRF 112 to PCEF 110 upon request from the PCEF 110. In further embodiments, a Gx interface using Diameter protocol may be used to provision SDF based charging rules from PCRF 112 to PCEF 110. PCEF 110 may then enforce the policy rules received from PCRF 112 (e.g., by setting up and modifying bearers for mapping IP service flows, by providing admission control, and by enforcing QoS limits).

Using the PCC rules, PCEF 110 may control access to external networks based on the PCC rules. For example, for an SDF (e.g., one or more related packets) that is under policy control, PCEF 110 may allow or disallow the SDF to pass through the node if the corresponding gate is open (e.g., as determined by one or more relevant PCC rules). According to embodiments herein, the amount of credit granted by an online charging service (OCS) 116 is authorized, or does not reach a threshold value; SDF may be allowed to pass through the node. Alternatively, where the amount of credit granted reaches a predefined threshold according to one or more credit reporting rule parameters (Tables 2, 4 and FIG. 3) PCEF 110 may prevent the SDF from passing through the node or reroute the traffic based upon a PCC rule triggered at PCRF 112.

Core network 106 may further include a proxy communicatively coupled with one or more Diameter nodes for communicating Diameter signaling messages between the one or more nodes in core network 106. For example, the proxy may be communicatively coupled with PCEF 110 and PCRF 112 and communicate messages between them via one or more signaling interfaces. The proxy may also be communicatively coupled with OCS 116 and communicate messages between PCEF 110, PCRF 112, and OCS 116 via one or more signaling interfaces. In one embodiment the proxy includes a message router or agent such as DRA/DSR 114 and may include functionality for monitoring and reporting the credit status of and/or a number of credits granted to subscribers in network 106 (e.g., via a CMR function 118). DRA/DSR 114 may include any suitable entity for routing or relaying Diameter signaling messages between Diameter nodes. For example, DRA/DSR 114 may include an LTE signaling router, an LTE Diameter signaling router, a Diameter signaling agent, a Diameter proxy, a Diameter routing agent, or a Diameter redirect agent.

As noted above, DRA/DSR 114 may be communicatively coupled to OCS 116 and/or other nodes via one or more signaling interfaces. For example, DRA/DSR 114 may intercept, receive, monitor, exchange, and/or communicate messages with or between PCEF 110 and OCS 118 via one or more Ro/Gy interfaces. In a second example, DRA/DSR 114 may receive, exchange, and/or communicate messages with PCRF 112 via a Gx interface. In one embodiment, DRA/DSR 114 communicates credit status information to PCRF 112 via the Gx interface, whereby PCRF 112 is notified to modify, adapt, and/or generate one or more PCC rules based upon the credit status associated with a subscriber of UE 102. Such credit status information may include one or more attribute value pairs (AVPs) contained within a monitored credit message received from OCS 116, or it may include a low balance indication AVP whereby upon receipt, PCRF 112 is configured to generate or modify a PCC rule.

In Diameter networks, PCEF 110 and OCS 116 may exchange credit control request (CCR) and credit control answer (CCA) messages. Such messages can be used for a number of purposes, such as for obtaining the number of credit units or credits, credit status, or other credit information for prepaid-type services and to trigger policy control. Such messages may also be used to alert subscribers that a certain monetary threshold has been exceeded in postpaid-type services and to trigger policy control. OCS 116 can consist of two primary functions (not shown) including a rating function (RF) and an account balance management function (ABMF). The RF can determine the value of the event, and can forward the event to the ABMF. The ABMF can query a prepaid billing system via a signaling interface and provide the CCA back to PCEF 110 via the OCS 116. The primary responsibility of OCS 116 is to collect all charging events in real-time, and to query the prepaid platform to determine the balance of the subscriber's account. OCS 116 may also alert a subscriber that a monetary threshold has been exceeded in postpaid platforms. Notably, the credit status information exchanged in CCR and CCA messages between PCEF 110 and OCS 116 may be monitored by DRA/DSR 114 and used to activate or trigger policy control via a notification sent to PCRF 112. This can advantageously amass CCR/CCA information at a single node (e.g., DRA/DSR 114) to trigger policy control, which can reduce signaling and processing capabilities at each of the PCEF 110, OCS 116, and PCRF 112.

In a prepaid call scenario, a CCR message may be sent from PCEF 110 (or GGSN) to OCS 116 to request permission to provide the service and deduct the necessary credits from the subscriber's balance. A CCR message may include a calling party identifier, such as an international mobile subscriber identity (IMSI), IP multimedia private identity (IMPI), IP multimedia public identity (IMPU), uniform resource identifier (URI) and/or a called party identifier, such as a mobile subscriber integrated services digital network (MSISDN) number. OCS 116 can use these identifiers to determine the rate at which the prepaid subscriber should be charged. In one embodiment, DRA/DSR 114 may extract and store such information from the CCR for a subsequent determination of whether or not a credit threshold crossing event has occurred by comparing the credit for the subscriber ID to one or more credit reporting rule parameters (e.g., see Tables 2, 4, and FIG. 3).

In response to receiving the CCR message, OCS 116 may communicate a CCA message to PCEF 110. The CCA message may be associated with the CCR message, and may include such information as the session ID for identifying the operation session, the application ID of a Diameter credit control application, the transfer type for session based charging, the event for event based charging, parameters for quota management (e.g., parameters defining the quotas to allow traffic to flow), the amount of granted service units for a particular category, and a low balance indication. Such information may be included in the CCA message as an AVP. The amount of granted service units for a particular category may include a number of service units before/after/during tariff changes, an amount of granted time (e.g., a number of minutes), an amount of sent/received octets, and/or an amount of service specific units (e.g., number of events). The amount of the granted service units may be the same as or different than the requested amount of credit or service units communicated in the CCR message, and may depend upon the balance of credits available for the monitored or targeted subscriber.

Still referring to FIG. 1, CMR function 118 can be integrated with and/or co-located at DRA/DSR 114, and can provide for credit status triggered policy control. In one embodiment, CMR 118 is provisioned with one or more credit status reporting rules, or credit reporting rules (e.g., see Tables 2, 4, and FIG. 3). Credit reporting rules may reside in a database and specify target subscribers(s), service/service context identifier(s), credit threshold parameter values (or a range of values), a list of CCR/CCA AVPs to be reported to PCRF 112, and/or an optional subscriber notification message. Such data is exemplary only, and any other parameter/attribute data included in the credit reporting rules is contemplated herein. The CMR function may determine whether an amount of granted credit for a service flow associated with the subscriber has reached a predetermined minimum threshold value based upon one or more of the credit reporting rules.

In one embodiment, CMR 118 is configured to observe and monitor CCR and CCA messages routed between PCEF 110 and OCS 116. CMR function 118 may also be configured to extract and temporarily store information, such as a session or service identifier and associated party identifier information (e.g., IMSI, IMPI, IMPU, MSISDN, URI, etc.) from an observed CCR message requesting service credit for a subscriber's service. CMR function 118 may also observe the amount of service units granted or credit granted within the CCA message. Using the information extracted and/or obtained from the CCR and CCA messages, CMR function 118 may determine whether any of the provisioned credit reporting rules are triggered. In one embodiment, credit reporting rules may be triggered when the amount of granted credit in the CCA message reaches or otherwise triggers a predefined minimum threshold value (e.g., Parameter 2 in Table 2). When the credit reporting rules are triggered, CMR function 118 may notify PCRF 112 of a triggered credit status reporting condition. The notification may include the party or subscriber identifier and credit status information communicated via one or more AVPs. PCRF 112 may then modify or generate one or more new PCC rules for the subscriber and install the new rule on the serving PCEF 110. In one embodiment, PCRF 112 signals PCEF 110 via a Gx interface with a RAR message including the new or modified PCC rules for the subscriber.

It will be appreciated that FIG. 1 is for illustrative purposes and that various nodes, their locations, and/or their functions may be changed, altered, added, or removed. For example, some nodes and/or functions may be combined into a single entity or a node and/or function may be located at or implemented by two or more nodes. For example, core network 106 may contain other nodes including one or more AF, SPR, mobility management entity (MME), home subscriber server (HSS), authentication, authorization, and accounting (AAA) server, and/or Bearer Binding and Event Reporting Function (BBERF).

Figure 2A:
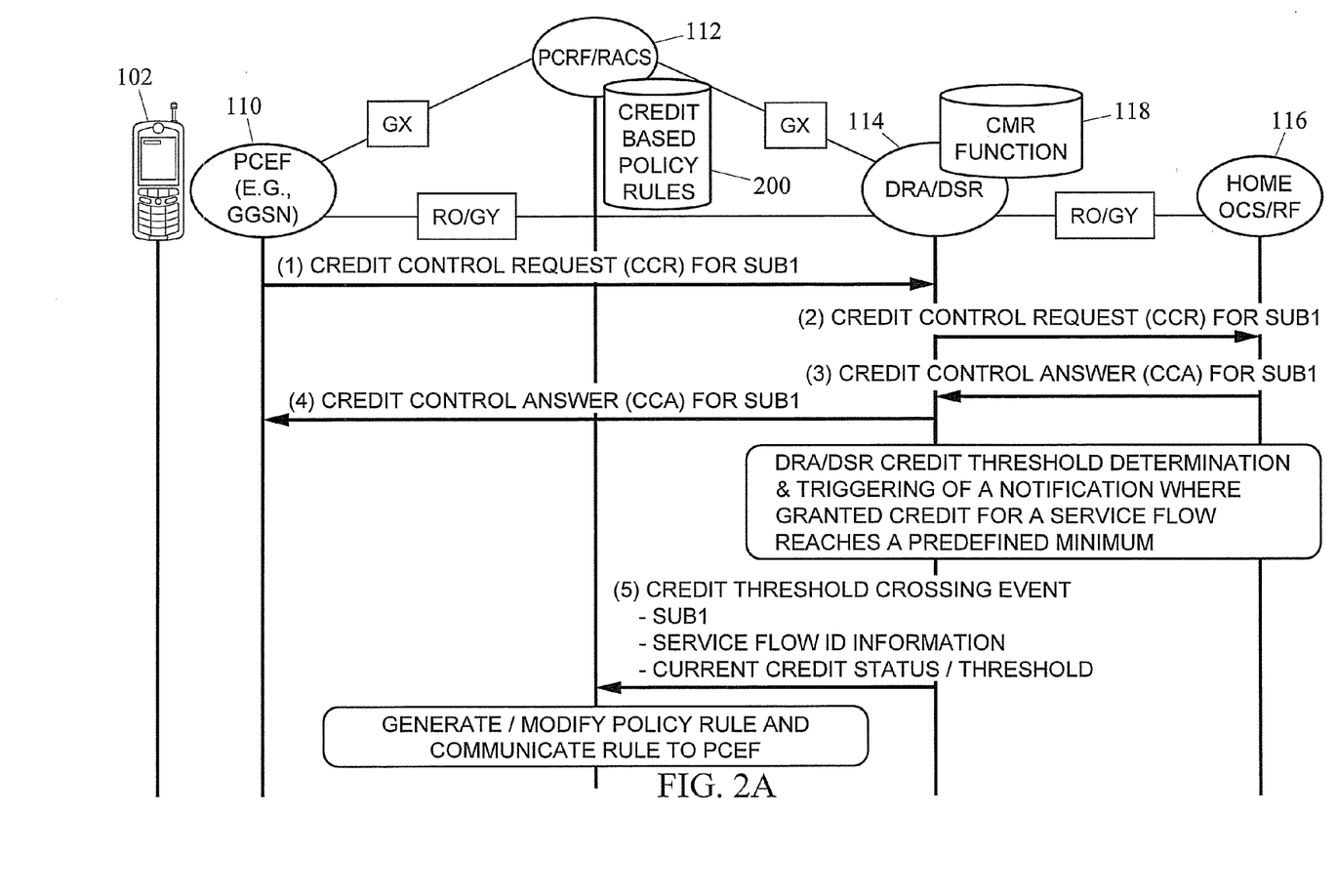
FIGS. 2A and 2B are message flow diagrams illustrating DRA based credit status triggered policy control according to an embodiment of the subject matter described herein.
Figure 2B:
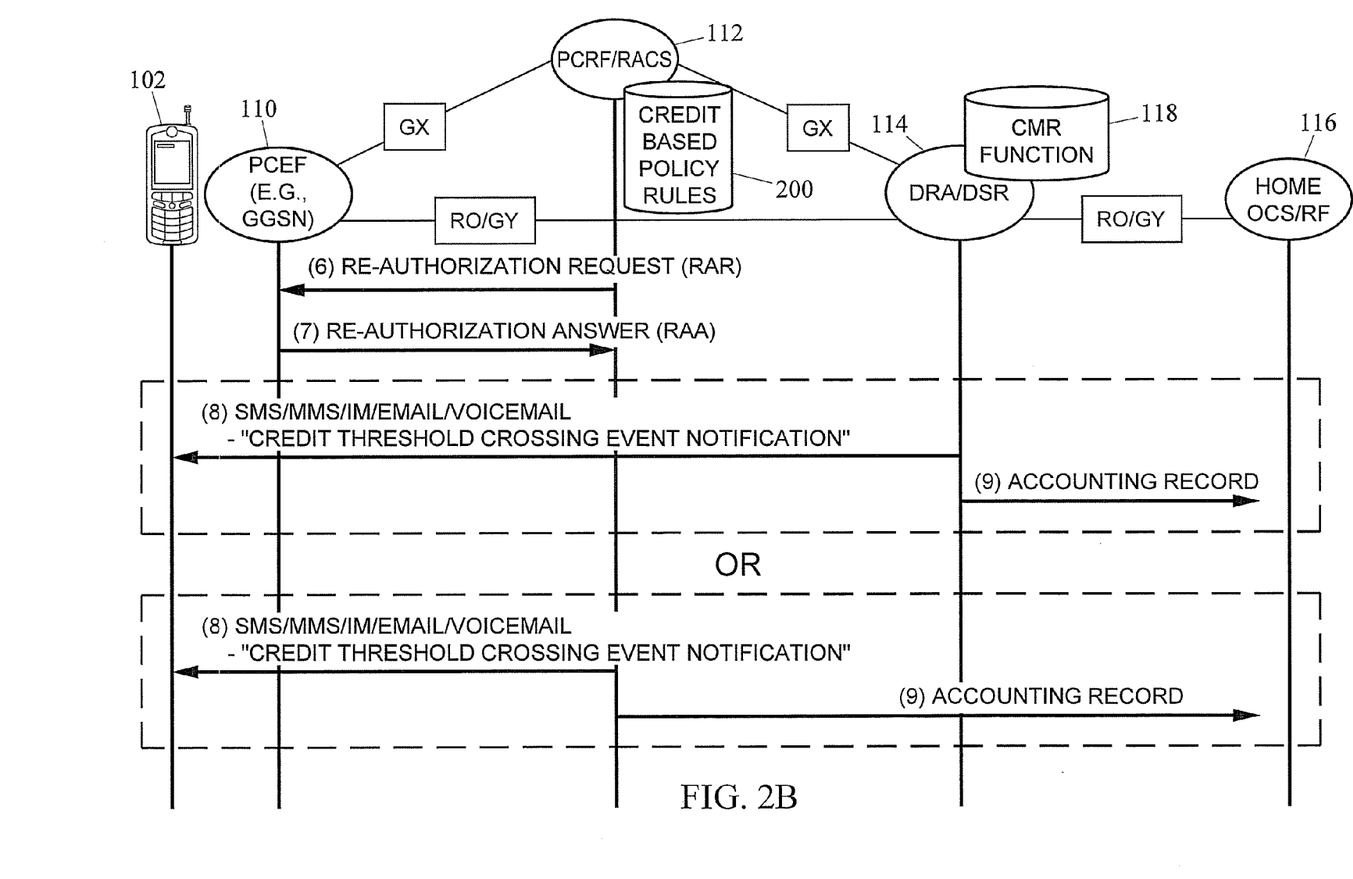

FIGS. 2A and 2B are message flow diagrams illustrating a first embodiment of DRA credit status triggered policy control according to embodiments of the subject matter described herein. With respect to FIGS. 2A, 2B, 4A, and 4B the Gx interface Diameter traffic between PCEF 110 and PCRF 112 can also be routed through DRA/DSR 114 as indicated by FIG. 1. However, for illustration purposes the direct logical relationship is shown for the Gx interface between PCEF 110 to PCRF 112 and PCRF 112 to DRA/DSR 114. In step (1) PCEF 110 routes a CCR message associated with a user (e.g., 'Sub1') towards OCS 116. The CCR message may be monitored via interception and observation at DRA/DSR 114. In one embodiment, PCRF 112 instructs PCEF 110 to request credit for services from OCS 116 to determine whether the subscriber has enough credit reserved and is thereby authorized to perform an action based upon the credit status and/or an amount of prepaid credits remaining for the subscriber. In other embodiments, PCEF 110 may request monetary threshold values from OCS 116, for example, in a postpaid scenario, for determining and/or alerting the user if he/she exceeds a specific monetary value. The CCR message may contain information regarding the caller or called party name, an amount of requested service units, or amount of requested credit, and a session identifier. In one embodiment, such information may be contained in one or more AVPs.

At step (1) of FIG. 2A, DRA/DSR 114 may optionally extract and store information contained in the CCR message for subsequent session ID-to-subscriber ID mapping. Such mapping can allow for determination of the correct CCA message corresponding to the previously intercepted/monitored CCR message, where such information is missing from the corresponding CCA message. DRA/DSR 114 may extract and store the session identifier (ID) and subscriber ID information and subsequently use the stored information for mapping to thereby identify corresponding CCA messages received from OCS 116. An example of exemplary information that may be extracted and stored at step (1) for subsequent look up is shown below in Table 1. For example, in Table 1 an association between the session ID and subscriber ID (e.g., IMSI, IMPI, IMPU, MSISDN, URI, etc.) is illustrated. Other parameters may be extracted, associated, and stored in DRA/DSR 114 and used for later correlation of corresponding CCR/CCA messages, and are hereby contemplated. A timestamp associated with the extracted data may also be generated and stored along with the extracted information for subsequent use and mapping.

TABLE 1

Exemplary Information Extracted from a CCR message and Stored at DRA/DSR for Session ID-to-Subscriber ID Mapping

| Session ID | Subscriber ID | Date/Timestamp |
| --- | --- | --- |
| SessionID_1 | Sub1 | 10/10/2011, 02:34:45 |

The 'Session ID' column in Table 1 above includes information regarding a subscriber's service. For example, Diameter sessions may be associated with a client generated session ID that is globally unique. The Session ID can be used to identify a particular session during further communication. The 'Subscriber ID' column in Table 1 above has the value 'Sub1' which is indicative of the subscriber for UE 102 and is associated with the unique Session ID upon extraction from the CCR. The subscriber ID may include one or more various identifiers associated with a user and/or user device (e.g., UE 102) such as one or more of the previously described identifiers including an IMSI, IMPI, IMPU, MSISDN, or URI. The 'Date/Timestamp' column in Table 1 above is a log of the date and time at which the credit was requested in the CCR message routed between PCEF 110 and OCS 116. The extraction and/or storage of information contained in the CCR is optional, and may be necessary where subscriber ID and/or session ID information is not explicitly included in the corresponding CCA message. For example, DRA/DSR 114 may extract the session and subscriber ID AVPs, store them along with the timestamp, and subsequently use the associated session ID and/or timestamp information to determine that a received CCA corresponds to the monitored CCR message by looking up the subscriber ID. Alternatively, the subscriber ID and/or timestamp information could be used determine that the CCA message corresponds to the monitored CCR message by looking up the session ID.

At step (2) of FIG. 2A, DRA/DSR 114 forwards the CCR message to OCS 116. OCS 116 can include a rating function (RF) which rates the event and facilitates retrieval or determination of the subscriber's account balance for prepaid subscribers. OCS 116 may also determine whether a monetary threshold has been exceeded for postpaid subscribers. At step (3), OCS 116 routes a CCA message towards PCEF 110 which is monitored and intercepted at DRA/DSR 114. In one embodiment, DRA/DSR 114 may determine that CCA corresponds to the monitored CCR message by examining subscriber ID and session ID AVPs contained within the CCA. Alternatively, CCA message may be correlated to CCR message at step (3), for example, by querying information contained in Table 1 where one of the session/subscriber ID information is missing from the CCA message. The CCA message is then forwarded to PCEF 110 at step (4). Several CCR and CCA messages may be exchanged between PCEF 110 and OCS 114, which may be intercepted and monitored by DRA/DSR 114. For illustration purposes only, one corresponding CCR and CCA message pair for Sub1 is illustrated, however, more than one may be exchanged depending upon the services requested and amount of available credit.

DRA/DSR 114 may continue to monitor corresponding CCR and CCA messages until a determination of a triggering or credit threshold crossing event. For example, CMR function 118 may be integrated and/or co-located with DRA/DSR 114. CMR function 118 may be provisioned with one or more predefined credit reporting rules (e.g., see Tables 2, 4, and FIG. 3). The credit reporting rules may reside in a database and include predefined threshold values, that when reached may trigger the credit threshold crossing event at step (5). The credit reporting rules may specify credit status information to be sent to PCRF 112, such as one or more CCA AVPs. In addition, the credit reporting rules may include a notification to be sent to the subscriber where the predefined rules or parameters are reached. For example, after monitoring CCR/CCA messages steps (1) to (4), DRA/DSR 114 may determine that the amount of granted units or credit for a service flow has reached a predefined minimum threshold value. In one embodiment, the predefined minimum threshold value includes a number of credits defined in the credit reporting rule (e.g., <=2 credits per Parameter 2, Table 2) with respect to prepaid services. In an alternate embodiment, the predefined minimum threshold value is triggered by the presence of a low balance indicator AVP (e.g., FIGS. 4A/4B). In further embodiments, the predefined minimum threshold value includes a monetary threshold value or limit defined in credit reporting rules, for example, with respect to postpaid services.

Where the number of granted units or credit for a service flow reaches the predefined threshold value, a notification message may be generated and sent to PCRF 112 informing the PCRF 112 of the subscriber's current credit status and credit threshold crossing event. Optionally, some or all of the CCA message content may be communicated to PCRF 112. The one or more credit reporting rules (e.g., as described below in Table 2 and FIG. 3) can determine whether CCA includes an amount of granted credit for a service flow that has reached the predefined value(s) according to the credit reporting rules. This determination triggers the credit threshold crossing event of step (5) whereby PCRF 112 is notified of the subscriber's credit status. In one embodiment, upon communication of the credit threshold crossing event, one or more credit status based policy rules 200 provisioned at PCRF 112 may become triggered based upon the credit status information received at step (5) such that one or more PCC rules are modified and/or generated and installed at serving PCEF 110. PCRF 112 may be provisioned with credit status based policy rules 200 such that upon receiving notification from DRA/DSR 114, it can respond by installing new or modified PCC rules on PCEF 110 serving the subscriber. The new or modified policy rules may then be communicated to PCEF 110.

An example of exemplary credit monitoring and reporting rule information that may be provisioned at CMR function 118 and be integrated with and/or co-located at DRA/DSR 114 is shown below in Table 2.

TABLE 2

Exemplary Credit Monitoring and Reporting Rules Provisioned at CMR Function

| Subscriber ID | Credit Threshold Rule Parameter 1: | Credit Threshold Value(s) Rule Parameter 2: | CCA AVP List to Be Reported to PCRF/RACS | Notification to Subscriber |
|---|---|---|---|---|
| Sub1 | Service ID_X + Service Context ID_Y | <=2 units | AVP_x, AVP_y | SMS ("Credit event Z just happened") |
| * | Service ID_A + Service Context ID B | <=5 units | * | None |

In Table 2 above, the 'Subscriber ID' column identifies the subscribing party or user, for example, 'Sub1' that is associated with UE 102 and corresponding CCR and CCA messages. The subscriber indicates the party requesting authorization for a session ID. The 'Credit Threshold Rule Parameter 1' column in Table 2 above includes a service ID and a service context ID pair. The service ID and the service context ID may uniquely identify a specific service that the CCR/CCA messages relate to, and may be uniquely identified by the combination of 'Service ID_X+Service Context ID_Y' AVPs. The 'Credit Threshold Value(s) Rule Parameter 2' includes a predefined minimum threshold value (or values) associated with Parameter 1. For example, Parameter 2 may include a number of service units or credits that when reached, may trigger the credit threshold crossing event notification message of step (5). For example, in Table 2 above, where target subscriber Sub1 requests a specific service and amount of service credits via CCR message, DRA/DSR 114 may determine, via a comparison of CCA parameters (e.g., an amount of units or credit granted) with Parameters 1 and 2 above, whether the event crossing threshold event of step (5) is triggered. For example, Parameter 2 for Sub1 in Table 2 indicates that where the CCA message includes that less than or equal to 2 units of credit granted, the credit threshold crossing event notification at step (5) will be triggered.

Table 2 also includes credit allocation or credit status information that may be provided to PCRF 112 in the notification at step (5). For example, the 'CCA AVP List to be reported to PCRF/RACS' includes credit status information that may be provided or communicated to PCRF 112 via the credit threshold crossing event notification at step (5). The 'Notification to Subscriber' column in Table 2 is optional and indicates that an SMS message is triggered and sent to subscriber notifying the subscriber that a credit event "Z" has occurred. For example, the credit event "Z" may include notification that an amount of credit granted for a service flow according to Parameters 1 and 2 has been reached (i.e., the subscriber will be notified that <=2 units of credit remain for a given service). In the alternative, PCRF 112 may issue the subscriber notification as a result of triggering the credit based policy rules 200 as explained with respect to Table 3 below.

Table 3 is an example of exemplary credit based policy rules 200 that may be provisioned at PCRF 112 in one embodiment according to the subject matter described herein.

TABLE 3

Exemplary Credit Based Policy Rules Provisioned at PCRF

| Subscriber ID | Credit Threshold Rule Parameter 1: | Credit Threshold Rule Parameter 2: | PCC Rule | Notification to Subscriber |
|---|---|---|---|---|
| Sub1 | Service ID_X + Service Context ID_Y | <=2 units | Redirect to URL_z | SMS ("Credit event Z just happened") |

The first three columns of Table 3 are the same as the first three columns of Table 2 and include credit based rule parameters. The first three parameters of Table 3 (e.g., 'Subscriber ID', 'Credit Threshold Rule Parameter 1' and 'Credit Threshold Rule Parameter 2') may be used trigger one or more new or modified PCC rules and a notification to the subscriber. For example, PCRF 112 can look up new or modified PCC rules by looking up information in the 'PCC Rule' column upon notification that the first three parameters have been met. That is, where 'Service ID_X' and 'Service ID_Y' for Sub1 has less than or equal to 2 units of credit remaining, the new (or modified) PCC rule of redirecting the subscriber to URL_z may be queried or automatically triggered and may go into effect upon installation at PCEF 110. The policy rules table may also trigger a notification to the subscriber, for example, via an SMS message. Accordingly, PCRF 112 may be adapted to activate the new policy rule and notify the subscriber of the credit status when triggered via credit based logic. Each of DRA/DSR 114 and PCRF 112 may be adapted or configured to notify subscriber or subscriber device UE 102 via a SMS message, a MMS message, an IM, an email message, a voicemail, an XML message, a simple object access protocol message, a Diameter protocol message, a SIP message, and combinations thereof.

The credit threshold crossing event at step (5) may include a notification providing the subscriber ID (e.g., Sub1) the service flow information (e.g., service ID and/or service context), and current credit status/threshold information including one or more CCA AVPs (e.g., indicating the number of credits remaining) according to Table 2. In response to receiving the credit status reporting message from DRA/DSR 114, PCRF 112 is adapted to generate a new policy and charging rule, for example, using the information contained in Table 3 and install the new PCC rule on the PCEF 110 serving subscriber Sub1.

At step (6) of FIG. 2B, PCRF 112 may signal the serving PCEF 110 via a Gx interface with a Diameter RAR message that includes the new or modified PCC rule for the subscriber. PCEF 110 may acknowledge the new rule in a re-authorization answer (RAA) message at step (7). Notification of the credit threshold crossing event may be sent to subscriber via UE 102 at step (8) and can be triggered by either DRA/DSR 114 as indicated by the upper step (8) contained in broken lines (e.g., according to the rules in Table 2) or by PCRF 112 as indicated by the lower step (8) contained in broken lines (e.g., according to the rules in Table 3). In one embodiment, the subscriber may be notified via a SMS message, a MMS message, an IM, an email message, a voicemail, an XML message, a simple object access protocol message, a Diameter protocol message, a SIP message, combinations thereof, and/or messages including any other suitable message protocol/format. Lastly, accounting rules may be sent downstream for additional processing at step (9) and may be sent via DRA/DSR 114 or PCRF 112 as indicated in FIG. 2B.

Figure 3:
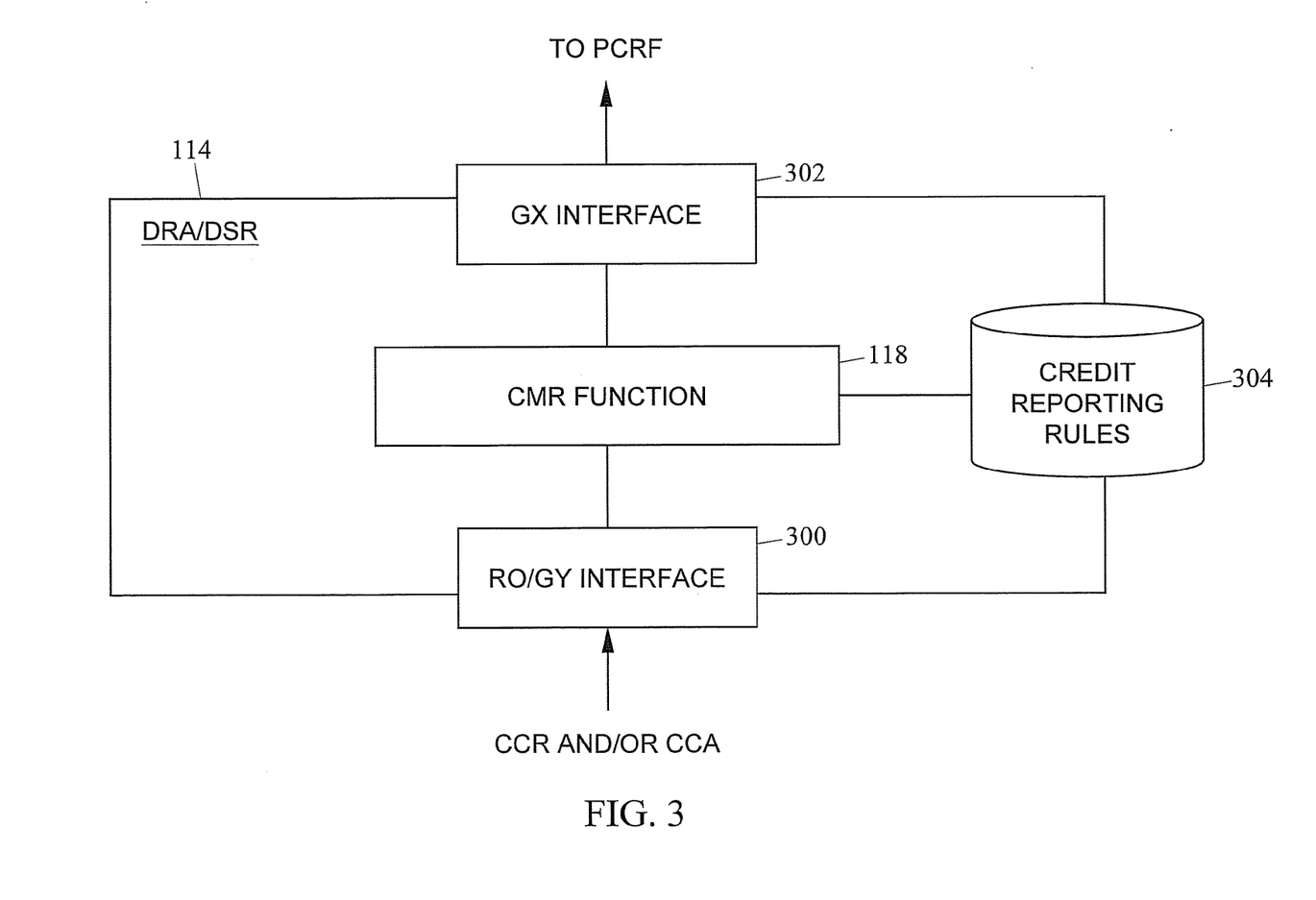
FIG. 3 is a block diagram illustrating an exemplary node for DRA based credit status triggered policy control according to an embodiment of the subject matter described herein.

FIG. 3 is block diagram illustrating an exemplary node for facilitating credit status triggered policy control according to an embodiment of the subject matter described herein. In one embodiment, the node comprises DRA/DSR 114. DRA/DSR 114 may include a first interface, a second interface, CMR function 118, and database of credit reporting rules 304. In one embodiment, first interface includes a Ro or Gy interface 300 for intercepting and monitoring exchanged CCR and CCA rules exchanged between PCEF 110 and OCS 116. In one embodiment, second interface includes a Gx interface 302 for communicating credit triggering or threshold crossing events to PCRF 112 for implementation of new or modified policy control.

As noted earlier, CMR function 118 may be configured to extract and store session ID and subscriber ID information for use in determining corresponding CCR/CCA messages (e.g., using exemplary data shown and described in Table 1). Such extraction/storage may be unnecessary or optional where CCA message includes both the session and subscriber ID. CMR function 118 may also be configured to receive data and query credit reporting rules 304 using the subscriber ID to determine whether rule parameters are met, and where the parameters are triggered, DRA/DSR 114 may notify PCRF 112 and/or the subscriber via UE 102 where applicable. For example, credit reporting rules 304 may include a database of information shown and described in Table 2 and/or Table 4 which is described further below. That is, credit reporting rules 304 may include the subscriber ID, a first parameter (e.g., including a combination of service and service context ID for uniquely identifying a session associated with the subscriber), an second parameter which may include a logic based rule applicable to an amount of granted units or credits in the CCA, credit information to be reported to PCRF 112 (e.g., CCA AVP list), and an optional subscriber notification. The second parameter may be optional, as described in FIGS. 4A and 4B, CCA may also be monitored for a low balance indication AVP which would logically meet the predefined minimum threshold.

In one embodiment, the credit reporting rules 304 are configured or predefined to detect the presence of a low balance indication AVP, and where present, send PCRF 112 notification (e.g., via Table 4 and FIGS. 4A/4B described further below). In one embodiment, CMR function 118 may monitor and receive credit status information (e.g., the number/amount of granted service units or credits) and/or AVPs within CCA message and compare that information to Parameter 2 of rules 304. Where the parameter is reached (e.g., the granted units are <=2 units) a notification is sent to PCRF 112 for credit triggered policy control. In one embodiment, PCRF 112 receives the subscriber ID, service flow ID, and one or more CCA AVPs with which it may generate or modify one or more PCC rules. In other embodiments, PCRF 112 may receive the subscriber ID, service flow ID, and rule parameters, and use the parameters to look up the new or modified PCC rule via credit based policy rules table 200 (e.g., such as Table 3). PCRF 112 may therefore be triggered, via credit information, to generated or modify the new PCC rule and may then signal PCEF 110 via a Gx interface using a RAR message which includes the new or modified policy rule. In one embodiment, PCRF 112 may also notify the subscriber of the credit event via one of a SMS message, a MMS message, an IM, an email message, a voicemail, an XML message, a simple object access protocol message, a Diameter protocol message, a SIP message, combinations thereof, and/or messages including any other suitable message protocol/format.

Figure 4A:
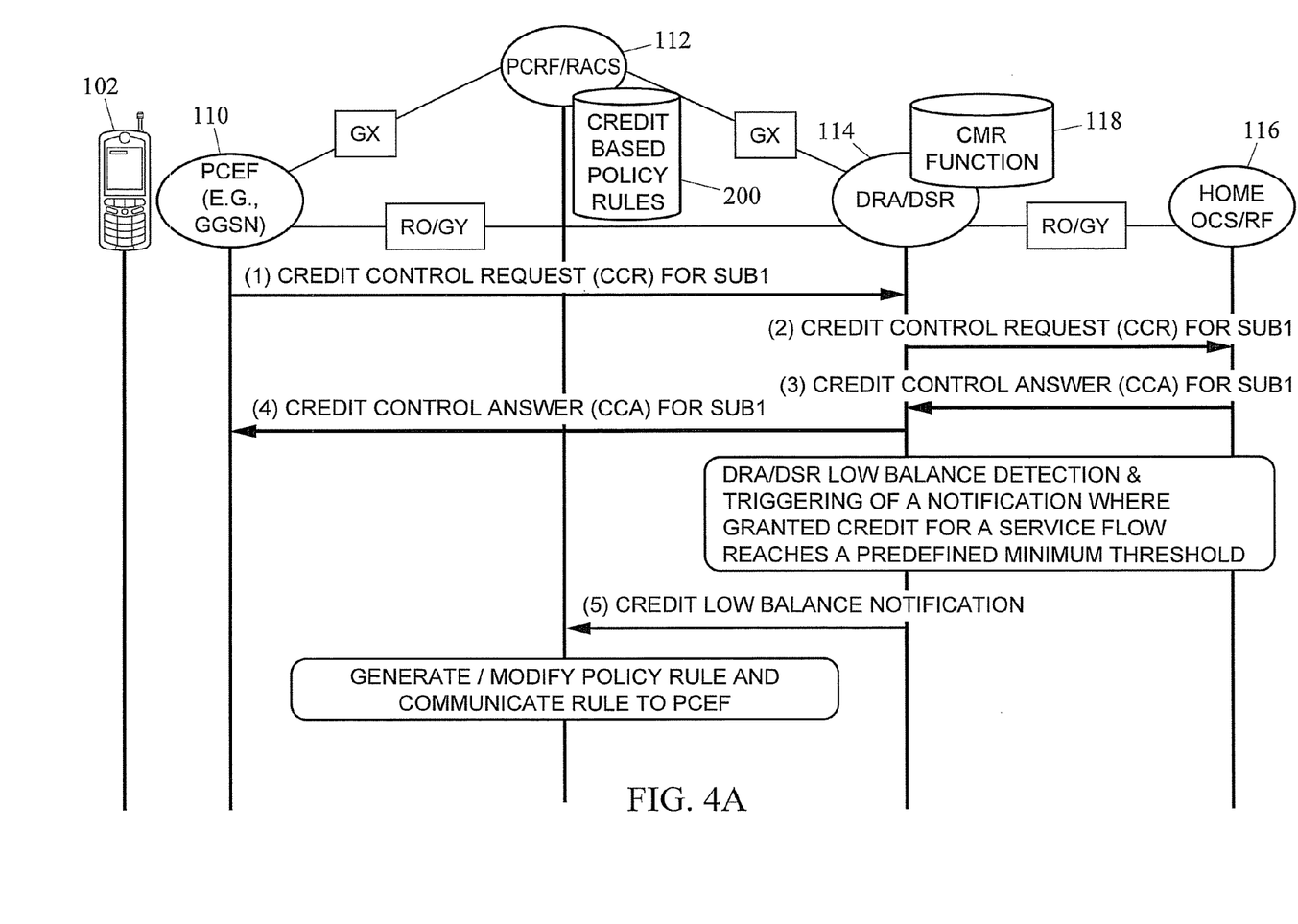
FIGS. 4A and 4B are message flow diagrams illustrating DRA based credit status triggered policy control according to another embodiment of the subject matter described herein.
Figure 4B:
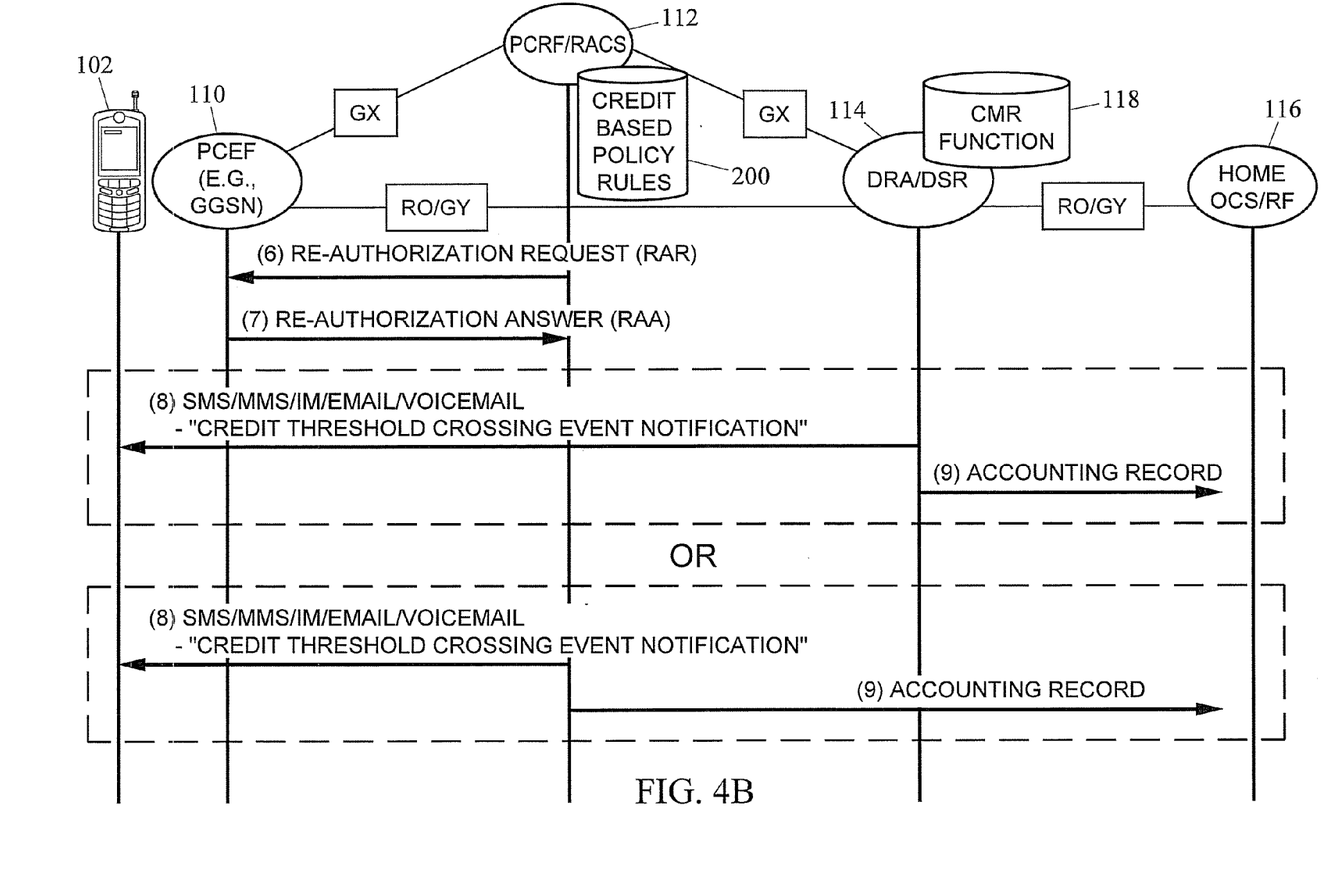

FIGS. 4A and 4B are message flow diagrams illustrating a second embodiment of credit status triggered policy control according to embodiments of the subject matter described herein. Steps (1) to (4) of FIG. 4A essentially correspond to steps (1) to (4) of FIG. 2A. That is, CCR and CCA messages associated with a subscriber (e.g., Sub1) are exchanged between PCEF 110 and OCS 116. DRA/DSR 114 may monitor the exchanged messages via CMR function 118, where CMR function 118 is integrated with or co-located at DRA/DSR 114. In the embodiment of FIGS. 4A and 48, DRA/DSR 114 determines whether a predefined minimum threshold is met by examining a low balance indication AVP in a CCA message associated with Sub1. Detection of the low balance indication in the CCA triggers a notification message to be generated and sent to PCRF 112 at step (5) informing the PCRF 112 of the subscriber's low balance. Some or all of the CCA message content may be communicated to PCRF 112. As described earlier, CMR function 114 may optionally extract and store subscriber ID/session ID information from the CCR message for determination of a corresponding CCA (e.g., via Table 1).

An example of exemplary credit monitoring and reporting rule information that may be provisioned at CMR function 118 and be integrated with and/or co-located at DRA/DSR 114 is shown below in Table 4.

TABLE 4

Exemplary Credit Monitoring and Reporting Rules Provisioned at CMR Function

| Subscriber ID | Credit Threshold Rule Parameter 1: | CCA AVP List to Be Reported to PCRF/RACS | Notification to Subscriber |
|---|---|---|---|
| Sub1 | Service ID_X + Service Context ID_Y | AVP_x, AVP_y | SMS ("Low Balance for Service X/Context Y") |
| * | Service ID_A + Service Context ID B | * | None |

Table 4 is another embodiment of exemplary of information that may be contained within credit reporting policy rules 304 of FIG. 3. Such information is exemplary only and other embodiments of the present subject matter may include credit reporting rules comprising fewer, more, or different parameter and/or attributes. In this embodiment, the subscriber ID and session ID information may be used to look up the credit information (e.g., list of CCA AVPs) to be reported to PCRF 112 in the low balance notification sent at step (5) of FIG. 4A. Upon receiving notification from DRA/DSR 114, PCRF 112 that a subscriber's account has a low balance, PCRF 112 may be adapted to generate a new policy rule for Sub1 and communicate the rule to serving PCEF 110 via a RAR message at step (6) of FIG. 4B. The new rule may be acknowledged in an RAA message at step (7). Subscriber notification can be triggered per the credit reporting policy rules 304, for example, via the 'Notification to Subscriber' column in Table 4 above. Where present, the notification may be sent via one of a SMS message, MMS, message, etc. to UE 102 sent from DRA/DSR 114 as indicated by the upper step (8) contained in broken lines (e.g., according to the rules in Table 4) or alternatively sent from PCRF 112 as indicated by the lower step (8) contained in broken lines (e.g., according to the rules in previously described Table 3). In one embodiment, the subscriber may be notified via a SMS message, a MMS message, an IM, an email message, a voicemail, an XML message, a simple object access protocol message, a Diameter protocol message, a SIP message, combinations thereof, and/or messages including any other suitable message protocol/format sent to UE 102. Lastly, one or more accounting rules may be sent downstream for additional processing at step (9) and may be sent by either DRA/DSR 114 or PCRF 112.

Figure 5:
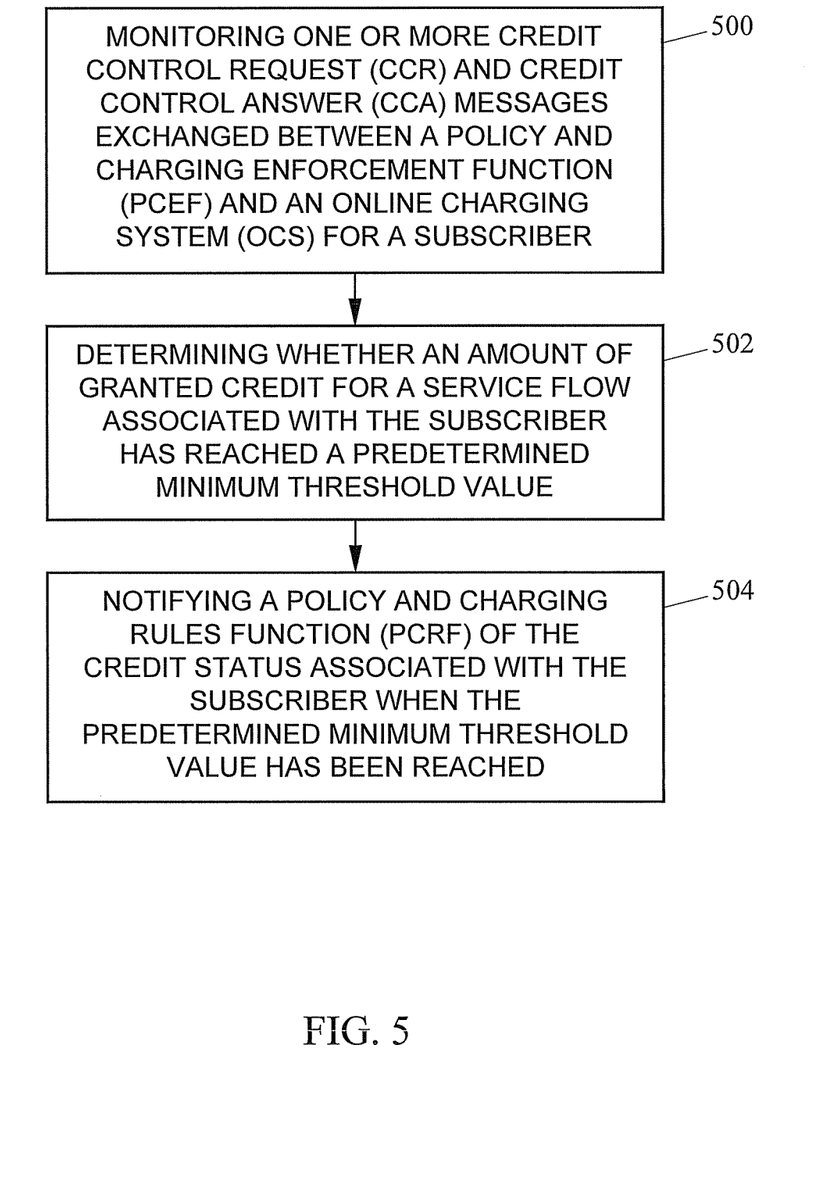
FIG. 5 is a flow chart illustrating exemplary steps for DRA based credit status triggered policy control according to an embodiment of the subject matter described herein.

FIG. 5 is a flow chart illustrating exemplary steps for DRA based credit status triggered policy control according to an embodiment of the subject matter described herein. Referring to FIG. 5, in step 500, one or more CCR and CCA messages associated with a subscriber and exchanged between the PCEF 110 and OCS 116 may be monitored. As described earlier, CMR function 118 may be integrated with and/or co-located at DRA/DSR 114. CCR and CCA messages may contain subscriber and/or service or session IDs and an amount of granted units or credit. Such information may be in the form of one or more AVPs. One or more credit reporting rules residing in a database accessible by CMR function 118 may become triggered based upon the amount of credit granted in the CCA message, or by the presence of a low balance indication AVP.

In step 502, CMR function 118 may determine whether an amount of granted credit for a service flow associated with the subscriber has reached a predetermined minimum threshold value. The granted credit information including the amount of granted credit (e.g., granted service units) may be contained in the CCA message. When the amount of granted credit observed in the CCA message reaches a predefined minimum threshold value, one or more new or modified PCC rules can become triggered based upon the credit status of the subscriber. For example, when the amount of granted credit reaches the predetermined minimum, PCRF 112 may become notified of the subscriber's credit status at step 504. In one embodiment, the predefined minimum threshold may include the number of credits remaining (e.g., 3 credits remaining or 0 credits remaining). In another embodiment, the predefined minimum threshold may include the presence of a low balance indication AVP the CCA message. Detection of the number of credits or low balance AVP may trigger an event notification message to be generated and sent to PCRF 112.

As a further and optional step in the process, PCRF may be adapted to modify and/or generate one or more new PCC rules based upon the notification received from DRA/DSR 114 (e.g., via CMR function 118). PCRF 112 may then install the new policy rule at the serving PCEF 110. Notably, methods, systems, and media described herein may enable PCRF 112 to modify, adjust, or generate new policies for subscribers based upon the observed credit allocation and/or credit status information received from DRA/DSR 114 via CMR function 118.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing credit status triggered policy control, the method comprising:
at a credit monitoring and reporting (CMR) function that is integrated with or co-located at a Diameter routing agent (DRA) or a Diameter signaling router (DSR) that is separate from an online charging system (OCS):
monitoring one or more credit control request (CCR) and credit control answer (CCA) messages exchanged between at least two nodes, the CCR and CCA messages being associated with a request of credit for a subscriber;
determining whether an amount of granted credit for a service flow associated with the subscriber has reached a predetermined minimum threshold value; and
notifying a policy and charging rules function (PCRF) of the credit status associated with the subscriber when the predetermined minimum threshold value has been reached.

2. The method of claim 1, further comprising the step of notifying the subscriber that the predetermined minimum threshold value has been reached via a subscriber device.

3. The method of claim 2, wherein notifying the subscriber via the subscriber device comprises sending notification from the DRA or DSR via one of a short message service (SMS) message, a multimedia message service (MMS) message, an instant message (IM), an email message, a voicemail, an XML message, a simple object access protocol message, a Diameter protocol message, a session initiation protocol (SIP) message, and combinations thereof.

4. The method of claim 2, wherein notifying the subscriber via the subscriber device comprises sending notification from the PCRF via one of a short message service (SMS) message, a multimedia message service (MMS) message, an instant message (IM), an email message, a voicemail, an XML message, a simple object access protocol message, a Diameter protocol message, a session initiation protocol (SIP) message, and combinations thereof.

5. The method of claim 1, further comprising, at the PCRF, in response to receiving the notification, modifying or generating a new policy and charging control (PCC) rule associated with the subscriber.

6. The method of claim 1, wherein monitoring CCR and CCA messages comprises intercepting and examining corresponding CCR and CCA messages routed between a policy and charging enforcement function (PCEF) and an OCS.

7. The method of claim 1, further comprising, at the CMR, extracting and temporarily storing information from the CCA regarding session and the subscriber.

8. The method of claim 1, wherein determining whether the amount of granted credit has reached a predetermined minimum threshold value comprises a comparing the number of granted credits or service units to a credit reporting rule parameter.

9. The method of claim 1, wherein determining whether the amount of granted credit has reached a predetermined minimum threshold value comprises examining a low balance indication attribute value pair (AVP) in the CCA message.

10. The method of claim 1, wherein credit status triggered policy control is for prepaid and postpaid subscribers.

11. A system for providing credit status triggered policy control, the system comprising:
- a credit monitoring and rules (CMR) function integrated with or co-located at a Diameter routing agent (DRA) or a Diameter signaling router (DSR) that is separate from an online charging system (OCS), the CME function configured to monitor one or more credit control request (CCR) and credit control answer (CCA) messages exchanged between at least two nodes, the messages being associated with a request of credit for a subscriber, and the CMR determining whether an amount of granted credit for a service flow associated with the subscriber has reached a predetermined minimum threshold value based upon one or more credit reporting rules; and
- an interface for notifying a policy and charging rules function (PCRF) of the credit status associated with the subscriber when the predetermined minimum threshold value has been reached.

12. The system of claim 11, wherein the DRA or DSR is adapted to notify a subscriber device the predetermined minimum threshold value has been reached.

13. The system of claim 12, wherein the subscriber device is adapted to receive notification via one of a short message service (SMS) message, a multimedia message service (MMS) message, an instant message (IM), an email message, a voicemail, an XML message, a simple object access protocol message, a Diameter protocol message, a session initiation protocol (SIP) message, and combinations thereof.

14. The system of claim 11, wherein the PCRF is adapted to notify a subscriber device the predetermined minimum threshold value has been reached.

15. The system of claim 11, wherein the PCRF is adapted to generate or modify a new policy and charging control (PCC) rule associated with the subscriber.

16. The system of claim 11, wherein the CMR function is adapted to monitor corresponding CCR and CCA messages routed between a policy and charging enforcement function (PCEF) and an OCS.

17. The system of claim 11, wherein the CMR is adapted to extract and temporarily store information from the CCA message regarding the session and the subscriber.

18. The system of claim 11, wherein the predetermined minimum threshold value comprises a number of credits or service units.

19. The system of claim 11, wherein the predetermined minimum threshold value is met by the presence of a low balance indication attribute value pair (AVP) in the CCA message.

20. The system of claim 11, wherein the system provides credit status triggered policy control for prepaid and postpaid subscribers.

21. A non-transitory computer readable medium having stored thereon computer executable instructions that when executed by a processor of a computer control the computer to perform steps comprising:
- at a credit monitoring and reporting (CMR) function that is integrated with or co-located at a Diameter routing agent (DRA) or a Diameter signaling router (DSR) that is separate from an online charging system (OCS):
  - monitoring one or more credit control request (CCR) and credit control answer (CCA) messages exchanged between at least two nodes, the CCR and CCA messages being associated with a request of credit for a subscriber;
  - determining whether an amount of granted credit for a service flow associated with the subscriber has reached a predetermined minimum threshold value; and
  - notifying a policy and charging rules function (PCRF) of the credit status associated with the subscriber when the predetermined minimum threshold value has been reached.

* * * * *